July 7, 1936.  L. A. HERRMANN  2,046,626
SHOCK ABSORBER
Filed March 30, 1934
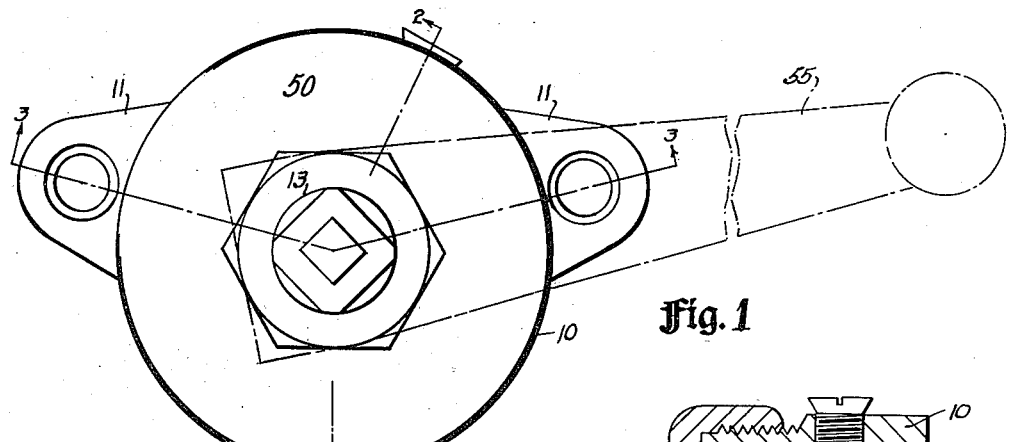
Fig. 1
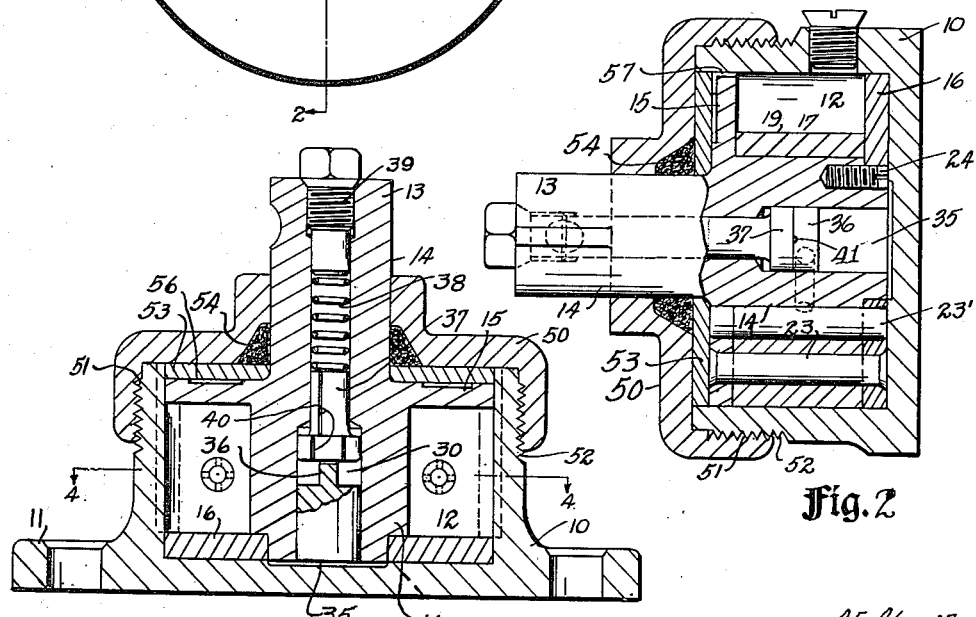
Fig. 2
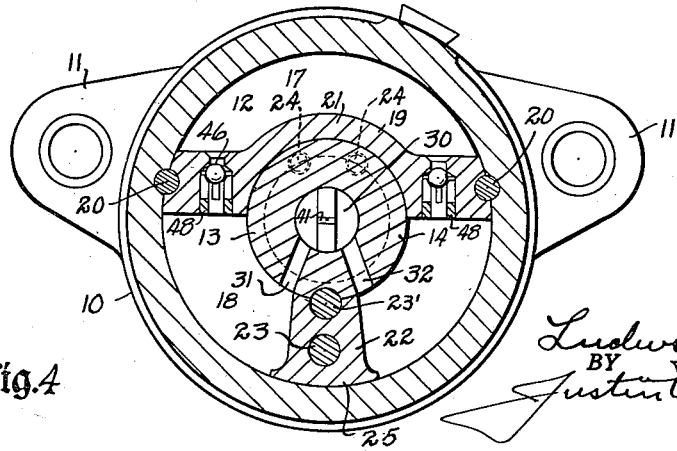
Fig. 3
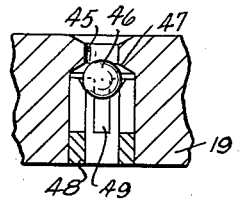
Fig. 5
Fig. 4
INVENTOR
Ludwig A. Herrmann,
BY Justin E. Macklin,
ATTORNEY Patented July 7, 1936

2,046,626

UNITED STATES PATENT OFFICE 2,046,626

SHOCK ABSORBER

Ludwig A. Herrmann, Cleveland, Ohio

Application March 30, 1934, Serial No. 718,287

6 Claims. (Cl. 188—89)

This invention relates to a hydraulic shock absorber and particularly to an improved shock absorber adapted for use on motor vehicles. As is well known to the trade there are many kinds of hydraulic shock absorbers now in use, some of which employ pistons reciprocating in cylinders while others employ moving vanes. In each type there is a relatively incompressible liquid which is placed under pressure by movement of the piston or vane and which is thereby forced through a restricted orifice so that the piston or movable vane and the members operatively associated therewith can move only at a very slow rate which is governed by the rate at which the liquid can escape through the orifice. Because of the high pressures which are present in a device of this character it is essential that the working parts fit very closely in order to prevent the escape of the liquid. It is essential also that the device be sealed so as to prevent the escape of liquid from the housing and that the device have as few working parts as possible in order that it can be constructed cheaply and so that the device will not readily become inoperative. In addition it is desirable that the device be constructed so that changes in the viscosity of the liquid in the device will not greatly affect the operation of the device.

It is an object of the present invention to provide an improved hydraulic shock absorber.

Another object of the invention is to provide a hydraulic shock absorber which the working parts can be constructed with a high degree of accuracy and which can be produced easily and cheaply.

A further object of the invention is to provide a hydraulic shock absorber incorporating an orifice of restricted size, the orifice being variable in size and in response to variations in the pressure and the rate of flow of the liquid to the orifice as a result of variations in the rate and amount of movement of the piston, vane or other movable member.

Another object of the invention is to provide a shock absorber which can be easily and effectively sealed to prevent the escape of the liquid contained in the shock absorber.

A still further object of the invention is to provide a shock absorber having a check valve which will open and close quickly and positively in response to the flow of liquid in the passage controlled by the valve.

Another object of the invention is to provide a shock absorber which has a minimum of working parts all of which are of substantial construction and which may be produced at low cost.

A further object of the invention is to provide a shock absorber in which the effects of changes of the viscosity of the fluid in the shock absorber are at minimum.

Other objects of the invention and features of novelty will be apparent from the following description taken in connection with the accompanying drawing in which Fig. 1 is an elevation view of one embodiment of the shock absorber provided by my invention, the arm by which the shock absorber is actuated being shown in broken lines.

Fig. 2 is a sectional view taken substantially along the line 2—2 of Fig. 1;

Fig. 3 is a sectional view taken substantially along the line 3—3 of Fig. 1;

Fig. 4 is a sectional view taken substantially along the line 4—4 of Fig. 3; and Fig. 5 is an enlarged fragmentary sectional view showing one form of check valve which I may employ in the shock absorber provided by my invention.

Referring to the drawing it will be seen that the shock absorber provided by my invention is similar in appearance to certain types of shock absorbers now in use and comprises a body which is adapted to be suited to either the frame or the axle of a motor vehicle and is actuated by means of an arm which is connected to the frame or the axle by suitable links not shown. On movement of the frame and axle relative to each other the shock absorber arm is actuated and the shock absorber operating through the arm controls the movement of the frame and axle relative to each other.

As shown in the drawing the shock absorber provided by my invention comprises a body which in the preferred form is a casting indicated by reference character 10 and having a pair of ears 11 extending therefrom by means of which the body may be secured to the vehicle. The body 10 is provided with a cylindrical recess indicated generally by the reference character 12. Positioned in the recess 12 is an oscillatable member indicated generally by the reference character 13 and as shown in the drawing this member comprises a substantially cylindrical hollow hub 14 having an angular flange 15 integral therewith and having the second annular flange 16 spaced from the first flange, the flange 16 being rigidly attached to the hub member 14. As will be seen in the drawing flanges 15 and 16 are each of substantially the same diameter as the recess 12 in the body 10, and it is desirable that these flanges fit the recess closely so that liquid under pressure cannot escape around the periphery of the flanges. It will be seen that the flanges 15 and 16 also serve as bearings for the member 13 when it is oscillated in the housing 10.

A baffle wall is provided to divide the recess 12 into a reservoir 17 and a work chamber 18 and as shown in the drawing the wall comprises a member indicated generally by the reference character 19 and disposed between the flanges 15 and 16 and having its ends secured to the body 10 so that it will not rotate in the recess 12. The shock absorber is mounted on the vehicle so that the reservoir is positioned above the work chamber. The member 19 may be secured to the body 10 in any desired manner but in a preferred form it is held by means of pins 20 which fit in cooperating substantially semi-circular recesses in the ends of the member 19 and the inner face of the body 10.

The member 19 is provided with a curved portion 21 intermediate its ends, the curved portion 21 being adapted to engage the cylindrical hub 14 of the member 13, and it is essential that these parts fit accurately to prevent the flow of liquid therebetween. It is essential also that the member 19 substantially fill the space between the flanges 15 and 16 so as to prevent the flow of liquid from the work chamber 18 to the reservoir 17 during operation of the shock absorber.

The member 13 is provided with the piston or movable vane 22 which separates the work chamber 18 into a compression portion and an expansion portion. The vane 22 fits between the flanges 15 and 16 and extends the entire radial distance between the hub 14 and the periphery of the flanges 15 and 16, and is rigidly secured to the member 13 by means of the rivet 23 which extends between the flanges 15 and 16 and by the dowel pin, and which also help to secure the flange 16 to the member 13. The flange 16 is additionally secured to the member 13 by screws 24 which extend across the joint between the flange and the member 13. The radially outer face of the member 22 is outwardly convex as at 25 so as to substantially engage the face of the cylindrical recess 12 throughout its entire width.

The member 13 is provided with a valve chamber indicated generally by the reference character 30 and in addition there are passages 31 and 32 leading from the valve chamber to the portions of the work chamber on opposite sides of the vane 22. As will be understood when the member 13 is oscillated the vane 22 will compress the liquid in one portion of the work chamber 18 and the liquid will be forced through one of the passages to the valve chamber 30 and thence through the other passage to the portion of the work chamber on the opposite side of the vane 22.

I have provided means for controlling the flow of liquid from one part of the work chamber to the other through the valve chamber and this means will now be described. As shown in the drawing the member 35 is fitted in the chamber 30 and has a projecting portion 36 extending across the chamber 30 between the ports leading to the passages 31 and 32. The member 35 fits tightly in the chamber 30 and is movable with the member 13 so that the projecting portion 36 is always disposed between the ports 31 and 32. A movable member in the form of a plunger 37 is also positioned in the valve chamber 30 and is resiliently yieldably held in engagement with the projecting portion 36 of the member 35 by means of the spring 38 which is placed between the member 37 and the screw 39. It will be understood that when liquid under pressure is forced into the valve chamber 30 through one of the passages leading from the work chamber the pressure of the liquid forces the plunger 37 away from the projecting portion 36 against the pressure of spring 38. This allows liquid to flow through the valve chamber and out the other passage to the opposite side of the work chamber. As will be understood the distance which the member 37 moves, and hence the size of the opening above the projecting portion 36, will vary with changes in the pressure of the liquid, and will be greater, the greater the pressure of the liquid.

In order that the plunger 37 can move freely in the valve chamber 30 without interference from the pressure of liquid or air in the chamber surrounding the spring 38 the member 37 is provided with grooves as indicated at 40 to permit the escape of fluids contained between the member 37 and the screw 39. It has been found desirable also to provide a small groove 41 extending across the face of the projecting portion 36 to permit small quantities of air in the shock absorber to move freely between the two parts of the valve chamber. This groove, however, should not be large enough to permit substantial quantities of liquid to flow without raising the plunger 37.

In order that the work chamber 18 will always be filled with liquid passages are provided in the baffle 19 and communicating the reservoir 17 and the portions of the work chamber on either side of the vane 22. These passages are indicated generally by the reference characters 45 and each passage is controlled by a check valve so that liquid can flow from the reservoir to the work chamber and so that the flow of liquid from work chamber to the reservoir is prohibited. As shown in the drawing the check valves each comprises a ball 46 disposed in the passage and engageable with a seat 47 formed in the member 19. The ball 46 is held in position adjacent the seat 47 by means of the member 48 which preferably comprises a tubular member which closely fits the passage 45 and which has its inner end slotted as at 49 so that liquid can readily flow from the reservoir 17 to the work chamber. It will be seen that when the liquid attempts to flow from the work chamber to the reservoir it flows through the aperture in the tubular member 48 and directly engages the ball 46, and forces the ball against the seat 47 to close the valve and prevent the flow of liquid. As the liquid which flows through the aperture in the tubular member 48 immediately and directly strikes the ball 46 this check valve operates very quickly and positively.

A cover is provided for the recess 12 and as shown in the drawing the cover comprises member 50 having a portion threaded as at 51 and adapted to engage the threads 52 on the outside of the housing 10. A disk 53 may be placed between the cover and the flange 15 to reduce the friction between these members when the member 13 is oscillated. The face of the flange 15 may be provided with an annular recess 56 in order to reduce the area of contact between the flange 15 and the disk.

In order to prevent the escape of a fluid in the body of the shock absorber, suitable packing 54 may be placed around the member 13 so as to be pressed against this member when the cover 50 is turned down on the threads 52. The arm 55, by means of which the shock absorber is actuated, may be secured to the end of the member 13 in any well known manner.

If desired a small groove 57 may be cut in the flange 15 and extending from the annular recess 56 radially outwardly to the periphery of the flange, and extending across the edge of the flange and communicating with the reservoir 17, as is best shown in Fig. 2. Any liquid which is forced out of the work chamber 18 around the flange 15 will flow into the recess 56 and when this is filled, if more liquid is forced out of the work chamber, the liquid in the recess will be placed under pressure and will be forced through the passage provided by the groove 57 back to the reservoir 17 which, of course, is not under pressure. This prevents the loss of the liquid from the shock absorber as the liquid will not be forced out around the packing 54.

In operation when the vehicle frame and axle move relative to each other the arm 55 is actuated, causing the member 13 to be oscillated relative to the housing 10 and the baffle wall 19. When the member 13 is oscillated the vane 22 is moved in the work chamber and the liquid in the portion of the work chamber between the vane and one end of the baffle 19 is placed under pressure and forced through one of the passages leading from the work chamber to the valve chamber 30, thereby increasing the pressure in the valve chamber and causing the spring pressed plunger 37 to compress the spring and permit liquid to flow over the projecting portion 36 on the member 30 and thence out through the other passage to the other side of the work chamber. It will be understood that the liquid under pressure cannot escape directly from the work chamber to the reservoir because the flow of liquid in this direction is prevented by the check valves in the passages in the wall 19. However, as liquid can freely flow from the reservoir 17 into the work chamber the work chamber is always kept filled with liquid.

It will be seen that the amount of liquid which can flow from one side of the valve chamber to the other and hence from one part of the work chamber to the other part is governed by the position of the plunger 37 which in turn is movable responsive to variations in the pressure of the liquid in the valve chamber. If the pressure is great the plunger 37 is moved a considerable distance from the projection 36 so that a large volume of liquid can flow across to projecting portion 36, while if the pressure is smaller, the distance between the plunger 37 and the projecting portion 36 will be small. The rate of flow of liquid from the compression portion of the work chamber therefore will vary in response to variations in the pressure imposed on the liquid.

While one embodiment of the shock absorber provided by my invention has been illustrated and described in detail, it should be understood that the invention is not limited to these details of construction, and that numerous changes and modifications can be made without departing from the scope of the following claims.

I claim:

1. In a device of the class described, a body having a substantially cylindrical recess therein, a member oscillatable in said recess, said oscillatable member comprising a hollow hub and a pair of spaced annular flanges, each of said flanges being of substantially the same diameter as the cylindrical recess, one of said flanges being disposed adjacent the bottom of said recess, a baffle wall comprising a member disposed between said flanges and having its ends secured to the body, said baffle wall dividing the recess in the body into a reservoir and a work chamber, a vane associated with the oscillatable member, the vane dividing the work chamber into a compression portion and an expansion portion, a passage in said hollow hub connecting the portions of said work chamber, a valve means in said hollow hub controlling the amount of opening of said passage, said valve means comprising a solid cylindrical element having a projecting portion and a pressure responsive member acting against said projecting portion, movement of said pressure responsive member determining the amount of opening through said valve means, and a means of adjustment of said pressure responsive member.

2. In a device of the class described, a body having a substantially cylindrical recess therein, a member oscillatable in said recess, said oscillatable member comprising a hollow hub and a pair of spaced annular flanges, each of said flanges being of substantially the same diameter as the cylindrical recess, one of said flanges being disposed adjacent the bottom of said recess, a baffle wall comprising a member disposed between said flanges and having its ends secured to the body, said baffle wall dividing the recess in the body into a reservoir and a work chamber, a vane associated with the oscillatable member, the vane dividing the work chamber into a compression portion and an expansion portion, the vane being operable on oscillation of the oscillatable member to force fluid to flow from the compression portion of the work chamber to the expansion portion of the work chamber, a valve means located in said hollow hub controlling the flow of fluid from the compression portion to the expansion portion of said work chamber, the amount of said flow per unit increment of time being dependent upon the pressure differential between said portions of said work chamber, and a means of adjustment of said valve means.

3. In a device of the class described, a body having a substantially cylindrical recess therein, a member oscillatable in said recess, said oscillatable member comprising a hollow hub and a pair of spaced annular flanges, each of said flanges being of substantially the same diameter as the cylindrical recess, one of said flanges being disposed adjacent the bottom of said recess, a baffle wall comprising a member disposed between said flanges and having its ends secured to the body, said baffle wall dividing the recess in the body into a reservoir and a work chamber, a vane associated with the oscillatable member, the vane dividing the work chamber into a compression portion and an expansion portion, the oscillatable member having a passage extending therethrough and communicating with the compression and expansion portions of the work chamber, pressure responsive valve means in said passage, and an adjustable means associated with said valve means wherein the adjustment is dependent upon the pressure differential existing between the portions of said work chamber.

4. In a device of the class described, a body having a substantially cylindrical recess therein, a member oscillatable in said recess, said oscillatable member comprising a hollow hub and a pair of spaced annular flanges, each of said flanges being of substantially the same diameter as the cylindrical recess, one of said flanges being disposed adjacent the bottom of said recess, a baffle wall comprising a member disposed between said flanges and having its ends secured to the body, said baffle wall dividing the recess in the body into a reservoir and a work chamber, and a vane associated with the oscillatable member, the vane dividing the work chamber into a compression portion and an expansion portion, the oscillatable member having a passage extending therethrough and communicating with the compression and expansion portions of the work chamber, and a movable member operable to close said passage, said member being resiliently yieldably urged toward the closed position, and being movable away from said closed position responsive to liquid pressures in said passage.

5. In a hydraulic shock absorber, the combination of a housing having a cylindrical recess therein, a transverse partition member having one side in a plane approximately at the horizontal axis of said recess and forming a reservoir on one side and a work chamber on the other, an oscillating member having a hub concentric with the recess, said hub having a hollow portion through its entire length and concentric with its axis and carrying a rigid vane fitting the cylindrical wall of the recess, passages through the partition at opposite sides of the hub and having check valves therein opening toward the work chamber, passages from opposite sides of the vane through the hub for by-passing liquid therethrough, a valve means in said hollow portion, said valve means comprising a solid cylindrical element having a projecting portion permitting a connection of the passages leading from the opposite sides of said vane, and a pressure responsive member acting against said projecting portion and controlling the amount of opening of said connection, and adjustable means interposed in said passages.

6. In a shock absorber, a body having a substantially cylindrical recess and means for attaching it to a member, rotating means in said recess and an oscillating member rigid therewith for attachment to another relatively movable member, a closure for said recess forming one side wall thereof and having a packing connection preventing leakage from the recess, a disk-like plate inside of the closure member, said oscillating member having a hollow hub and outwardly extending flanges at the sides of the recess, and a partition member rigidly fitted to the cylindrical wall of the recess and embracing the oscillating member and fitting between said flanges, the oscillating member having a vane at one side of the partition and there being a by-pass through the hub from one side of the vane to the other, a valve means in said hollow hub controlling the said by-pass, an adjustable compressible means acting against such valve means and determining the amount of opening of said by-pass by the pressure differential on each side of said vane member, and said partition having check valve openings each adapted to close as the vane moves toward it.

LUDWIG A. HERRMANN.